Patented June 12, 1951

2,557,057

UNITED STATES PATENT OFFICE 2,557,057

DISAZO DYESTUFF

Fritz Straub, Kaiseraugst, and Jakob Brassel and Peter Pieth, Basel, Switzerland, assignors to Ciba Limited, a Swiss firm No Drawing. Application December 29, 1947, Serial No. 794,459. In Switzerland December 20, 1943

Section 1, Public Law 690, August 8, 1946
Patent expires December 20, 1963

1 Claim. (Cl. 260—161)

This application is a continuation-in-part of our copending applications Serial No. 431,172, filed February 16, 1942, now abandoned, and Serial No. 498,885, filed August 16, 1943 (now Pat. No. 2,439,153), the latter being a continuation-in-part of the former.

Swiss Patent No. 163,896 describes a process for the manufacture of the dyestuff of the formula

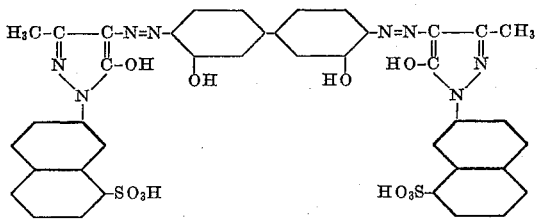

This dyestuff is prepared by coupling of tetrazotized 3:3'-dimethoxy - 4:4' - diaminodiphenyl with 1-(8'-sulfo-2'-naphthyl)-3-methyl-5 - pyrazolone, coppering the resultant disazo dyestuff with splitting of the methoxy groups, and decoppering of the complex copper compound.

We have now discovered that a very useful dyestuff of similar constitution can be obtained in a much simpler manner, i. e. by combining 1 mol of tetrazotized 3:3'-dihydroxy-4:4'-diaminodiphenyl in an aqueous alkaline medium with 2 mols of 3-methyl-5-pyrazolone. The new dyestuff is represented by the formula

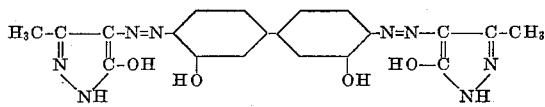

and is distinguished by its production on vegetable fibers of coppered dyeings of outstanding fastness to washing. These dyeings are much faster to washing than those obtained with the known dyestuff of the first above indicated formula.

3:3'-dihydroxy-4:4'-diaminodiphenyl may be obtained by saponification of 3:3'-dimethoxy-4:4'-diaminodiphenyl by means of aluminum chloride and may be purified, if necessary, according to known methods. It may be tetrazotized in known manner and the tetrazo compound may be used immediately after tetrazotizing or may be separated as described in Example 1 below.

The tetrazo compound is coupled in an alkaline medium, for example, one which contains alkali hydroxide, preferably one containing alkali carbonate, such as sodium carbonate.

The new dyestuff which is obtained by the instant process is suitable principally for dyeing cellulosic materials, such as cotton, linen, rayon, or staple fibers of regenerated cellulose. Especially valuable results are obtained under the usual processes by treating the dyestuff on the fiber, or partly on the fiber and partly in the dyebath, with agents yielding metal, preferably agents yielding copper. It is of advantage to follow the procedure of U. S. Patent No. 2,185,905 which consists in first dyeing the material and then treating it in the same bath with agents yielding metal. The latter should preferably be stable towards alkaline solutions, such as complex copper tartrate.

In the following examples, the parts are parts by weight and the percentages are percentages by weight.

Example 1

21.6 parts of 3:3'-dihydroxy-4:4'-diaminodiphenyl, in the form of the hydrochloride, are stirred in 100 parts of water and 12 parts of concentrated hydrochloric acid and tetrazotized at 5 to 8° C. with an aqueous solution of 13.8 parts of sodium nitrite. When the reaction is complete, the suspension is cooled to 3° C. and neutralized by the addition of 6.4 parts of anhydrous sodium carbonate and the precipitated tetrazo compound is filtered off.

19.6 parts of 3-methyl-5-pyrazolone are dissolved in 400 parts of water by the addition of 44 parts of anhydrous sodium carbonate. To this solution, previously cooled to 5° C., the tetrazo compound prepared as above is added. The coupling temperature is maintained for 3 hours at 5–8° C. and then for 20 hours at 10–25° C. Finally the new disazo dyestuff, which has precipitated completely is filtered off, washed on the filter with water, and dried.

It forms a bronzy black powder dissolving in water, diluted sodium hydroxide solution, or diluted sodium carbonate solution with an orange-red coloration and in concentrated sulfuric acid with a bluish red coloration. It dyes cellulose fibers by the single bath or 2-bath coppering process Bordeaux-red tints of excellent fastness to washing.

Example 2

0.8 part of the dyestuff obtained according to Example 1 is dissolved in 250 parts of hot water by the addition of 0.8 part of sodium hydroxide solution of 30 per cent strength. This solution is added to a dyebath consisting of 2000 parts of water and 2 parts of sodium carbonate. At 50° C. 100 parts of well wetted cotton are entered and the temperature raised to 95° C. within half an hour and 30 parts of Glauber's salt are then added. After dyeing for about ¾ of an hour at this temperature the bath is allowed to cool to 80° C., and 2 parts of a complex copper sodium tartrate are then added and coppering carried out for half an hour at 80 to 90° C. The cotton is well rinsed and if necessary soaped. It is dyed a fast Bordeaux.

What we claim is.

The disazo-dyestuff of the formula

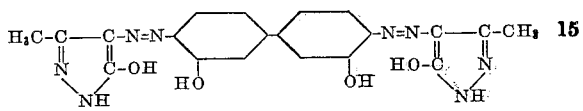

FRITZ STRAUB.
JAKOB BRASSEL.
PETER PIETH.

REFERENCES CITED

The following references are of record in the file of this patent:

UNITED STATES PATENTS

| Number | Name | Date |
|---|---|---|
| 1,210,751 | Anderwert et al. | Jan. 2, 1917 |
| 1,959,733 | Niemann | May 22, 1934 |
| 2,193,438 | Taube et al. | Mar. 12, 1940 |
| 2,194,847 | Krzikalla et al. | Mar. 26, 1940 |
| 2,241,796 | Taube et al. | May 13, 1941 |
| 2,404,198 | Straub et al. | July 16, 1946 |
| 2,439,153 | Straub et al. | Apr. 6, 1948 |

FOREIGN PATENTS

| Number | Country | Date |
|---|---|---|
| 410,192 | Great Britain | May 14, 1934 |
| 232,505 | Sweden | Aug. 16, 1944 |
| 107,229 | Sweden | Apr. 27, 1943 |